T. COOPER.
MANUFACTURE OF BEARING SLEEVES.
APPLICATION FILED MAY 20, 1912.
1,048,945.
Patented Dec. 31, 1912.
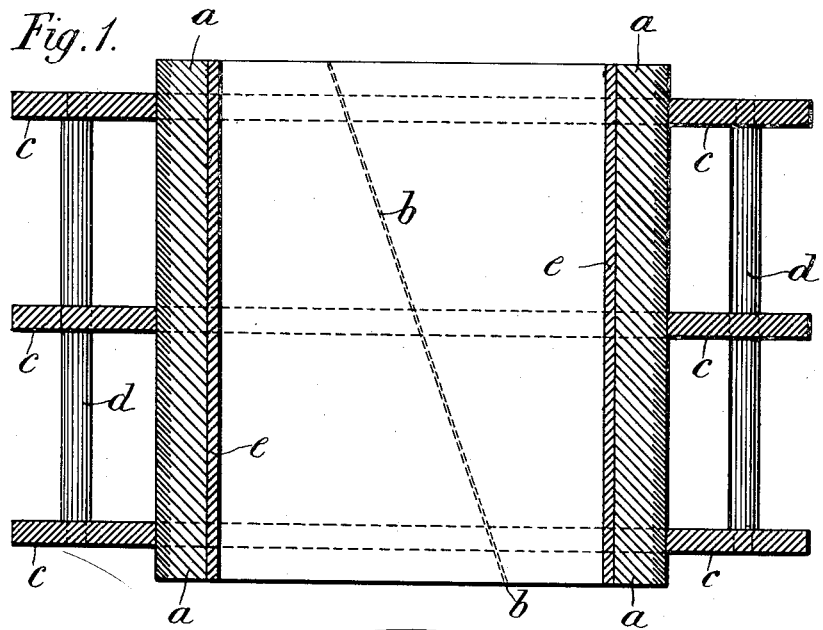
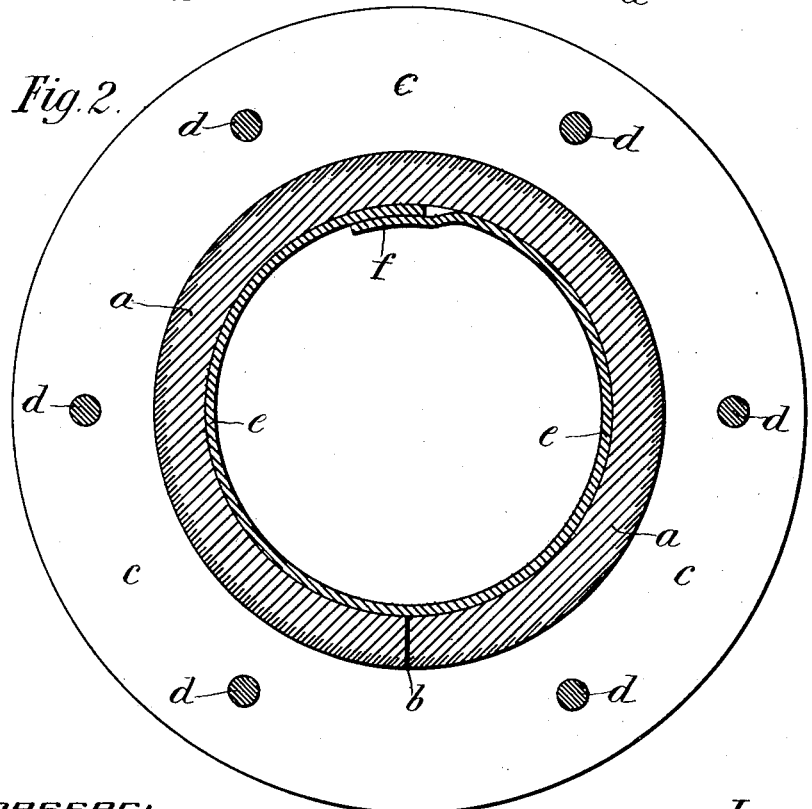
Witnesses:-
Inventor:

UNITED STATES PATENT OFFICE.

THOMAS COOPER, OF KINGS LYNN, ENGLAND.

MANUFACTURE OF BEARING-SLEEVES.

1,048,945.

Specification of Letters Patent.

Patented Dec. 31, 1912.

Application filed May 20, 1912. Serial No. 698,495.

*To all whom it may concern:*

Be it known that I, THOMAS COOPER, a subject of the King of Great Britain, and resident of The Steel Works, Kings Lynn, Norfolk, England, have invented new and useful Improvements in the Manufacture of Bearing-Sleeves, of which the following is a specification.

The present invention has reference to the manufacture of steel sleeves with which the axles of railway or tramway rolling stock and other vehicles or any shafts where the sleeves may be passed over the end are fitted to take the wear of the anti-friction rollers or balls. It is necessary for these sleeves to be extremely hard externally for about one third of their thickness to stand the wear, while the remaining two-thirds should be of tough mild steel that will not harden, to give strength to the sleeves to avoid cracking. The manufacture of such sleeves of stratified steel presents considerable difficulties as owing to the quality of steel used for the external stratum they cannot be satisfactorily welded to form solid rings. They are therefore made open or unwelded at the side and the hardening process as hitherto carried out has the effect of opening the joint and rendering the sleeve useless for the purpose for which it is required.

By the method and apparatus forming the subject of the present invention sleeves can be conveniently made wherein the ends of the bar bent to a circle to form a sleeve, are not only close, but are held together very firmly by the tension set up in the internal portion of the sleeve itself.

In carrying out this invention a bar of stratified steel of suitable quality is prepared and bent to a circle to form a sleeve or bush and after being machined ready for hardening it is heated in any suitable furnace in the usual way. A cage or frame is provided of proper size to go over the outside of the sleeve and so constructed that while it will freely admit the water or other hardening fluid to the outside surface of the sleeve it will not allow the ring to open at the joint. A moderately thin bush or lining is also provided having a lap joint and being of suitable diameter to fit inside the sleeve, the object being to keep the internal portion from free contact with the water when immersed for hardening.

In the accompanying drawing I have shown a sleeve inclosed in a cage ready for hardening.

Figure 1 is a sectional elevation and Fig. 2 is a sectional plan view.

$a$ is the sleeve of stratified steel open at $b$. The cage for inclosing the same may be of any suitable construction. As shown it consists of three solid rings $c$ connected together by spacing bars $d$.

$e$ is a bush or lining having a lapped joint at $f$ placed within the sleeve $a$ so as to protect its interior from the hardening liquid. As an alternative to the bush or lining, plates at the ends of the sleeve can be used to exclude water, but the bush is preferable.

Assume now that the sleeve $a$ is suitably heated,—the before mentioned cage is put over the outside of the sleeve and the bush $e$ is placed inside and the whole is plunged in water or other fluid. It follows that as the fluid can act directly on the outside of the sleeve and not on the inside—the former will be made comparatively cool while the inside is still red hot. Owing to this cooling the outside portion contracts and if not securely held by the cage or frame would open outward; but as it is prevented from doing this, the great tension set up acts on the internal portion which is still hot and compresses the metal. In due course the internal portion cools and sets up contraction, but the external part is cooled so as to be incompressible—the tension on the internal face therefore acts to draw the edges of the sleeve ring at $b$ firmly together, which it does very effectually and sleeves of suitable thickness can be used on axles and shafts without being gripped with clips or rings. For railway or similar service, however, I prefer to provide additional retaining rings for extra security.

What I claim and desire to secure by Letters Patent of the United States is:—

The method of manufacturing sleeves used in roller or ball bearings for axles, shafts, and the like which consists in bending bars or plates of stratified steel into sleeve form with the wearing surface outward heating the sleeve so bent, confining the sleeve on the outside to prevent opening without preventing contact with the hardening liquid on the outside, protecting the interior of the sleeve to prevent access of the hardening liquid thereto and finally plunging the sleeve into the hardening liquid.

In testimony whereof I have signed my name to this specification in the presence of two subscribing witnesses.

THOMAS COOPER.

Witnesses:
F. J. CUTHBERT,
G. FOSBURY.